(12) United States Patent
Bonneville et al.

(10) Patent No.: US 12,309,632 B2
(45) Date of Patent: May 20, 2025

(54) METHOD TO DETERMINE A QUALITY OF SERVICE, COMPUTER-READABLE STORAGE MEDIUM AND DEVICE

(71) Applicant: MITSUBISHI ELECTRIC CORPORATION, Tokyo (JP)

(72) Inventors: Herve Bonneville, Rennes (FR); Mourad Khanfouci, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 324 days.

(21) Appl. No.: 17/795,050

(22) PCT Filed: Dec. 17, 2020

(86) PCT No.: PCT/JP2020/048610
§ 371 (c)(1),
(2) Date: Jul. 25, 2022

(87) PCT Pub. No.: WO2021/171773
PCT Pub. Date: Sep. 2, 2021

(65) Prior Publication Data
US 2023/0053602 A1 Feb. 23, 2023

(30) Foreign Application Priority Data

Feb. 27, 2020 (EP) ..................... 20305195

(51) Int. Cl.
*H04W 28/02* (2009.01)
*H04W 28/24* (2009.01)
(52) U.S. Cl.
CPC ....... *H04W 28/0268* (2013.01); *H04W 28/24* (2013.01)

(58) Field of Classification Search
CPC ......................... H04W 28/0268; H04W 28/24
See application file for complete search history.

(56) References Cited

U.S. PATENT DOCUMENTS

| | | | |
|---|---|---|---|
| 2005/0071459 A1* | 3/2005 | Costa-Requena | H04L 65/765 709/224 |
| 2007/0008902 A1* | 1/2007 | Yaramada | H04L 47/805 370/252 |

(Continued)

FOREIGN PATENT DOCUMENTS

| | | |
|---|---|---|
| CN | 110121181 A | 8/2019 |
| WO | WO2020/035130 A1 | 2/2020 |

OTHER PUBLICATIONS

Manet QoS support without reservations (Year: 2010).*

(Continued)

*Primary Examiner* — Peter Chen
*Assistant Examiner* — Guoxing Fan
(74) *Attorney, Agent, or Firm* — Birch, Stewart, Kolasch & Birch, LLP

(57) ABSTRACT

Examples include a method to determine a Quality of Service, QoS, parameter, comprising receiving, at a base station, and from a transmitting entity, a QoS parameter request for a session, whereby the request comprises a descriptor for the session and an indication that the session is a probing session. The method further includes determining, at the base station, the QoS parameter related to the probing session; and transmitting, by the base station, the determined QoS parameter to a receiving entity.

13 Claims, 6 Drawing Sheets

(56) References Cited

U.S. PATENT DOCUMENTS

| | | | |
|---|---|---|---|
| 2020/0007416 A1* | 1/2020 | Srinivas | H04W 28/0268 |
| 2021/0219357 A1* | 7/2021 | Talebi Fard | H04W 48/16 |
| 2021/0274375 A1* | 9/2021 | Li | H04W 28/10 |
| 2022/0078662 A1* | 3/2022 | Wang | H04M 15/66 |
| 2022/0182896 A1* | 6/2022 | Talebi Fard | H04W 36/0085 |
| 2022/0256393 A1* | 8/2022 | Zhang | H04W 28/0263 |

OTHER PUBLICATIONS

International Search Report (PCT/ISA/210) issued in PCT/JP2020/048610, dated Apr. 29, 2021.
Written Opinion (PCT/ISA/237) issued in PCT/JP2020/048610, dated Apr. 29, 2021.
Japanese Office Action for Japanese Application No. 2022-555259, dated Jun. 6, 2023, with an English translation.
Chinese Office Action and Search Report for Chinese Application No. 202080097023.2, dated Jan. 26, 2025, with English translation.

* cited by examiner

METHOD TO DETERMINE A QUALITY OF SERVICE, COMPUTER-READABLE STORAGE MEDIUM AND DEVICE

TECHNICAL FIELD

The present invention relates generally to a method to determine a quality of service, a computer-readable storage medium and a device.

BACKGROUND ART

Some communication networks operate within timeliness constraints in order to transmit data between network entities within a predictable time window. Such networks may have a centralized architecture, a distributed architecture, or a hybrid architecture.

SUMMARY OF INVENTION

The invention is defined by the appended independent claims. Additional features and advantages of the concepts herein disclosed are set forth in the description which follows.

The present disclosure describes a method to determine a Quality of Service, QoS, parameter, the method comprising:
  receiving, at a base station, and from a transmitting entity, a QoS parameter request for a session, whereby the request comprises a descriptor for the session and an indication that the session is a probing session;
  determining, at the base station, the QoS parameter related to the probing session; and
  transmitting, by the base station, the determined QoS parameter to a receiving entity.

Such a method enables a proactive determination of a QoS parameter by interrogating a base station instead of proceeding in an iterative trial and error reactive manner to determine such a QoS parameter.

Optionally, the transmitting entity and the receiving entity is a same entity. This permits for example operating such a method in a centralized communication network, the transmitting and receiving entity acting as a central control entity.

Optionally, the transmitting entity and the receiving entity is a Time Sensitive Networks Application Function, TSN-AF, entity. In some examples, this permits integrating a wireless communication system such as a 5G system as a TSN bridge into a TSN network.

Optionally, the request comprises several messages. This permits simplifying the communication of the request into several dedicated messages, each message carrying a specific element of the request.

Optionally, the base station does not reserve resources as an action relative to the request. This enables a determination of a QoS parameter by interrogating a base station about such QoS parameter for a given session without opening such a session, thereby without impacting existing open sessions and resources at the base station.

Optionally, the QoS parameter request comprises a QoS parameter determination context, whereby the QoS parameter determination context comprises both a parameter determination constraint and an indication of a type of QoS parameter to be determined within the parameter determination constraint. This enables a precise determination of the QoS parameter by explicitly providing information as to the QoS parameter type to be determined, and as to conditions under which such QoS parameter should be determined. More specifically, in some cases the QoS parameter determination constraint comprises one or more of a maximum bit rate, priority, or packet error rate, whereby the type of QoS parameter to be determined within the parameter determination constraint comprises delay information. This is particularly adapted to the integration of a wireless bridge in a time sensitive network.

Optionally, the request comprises a probing flag, the probing flag indicating considering the probing session as replacing current active sessions at the base station, or the probing flag indicating considering the probing session in addition to current active sessions at the base station. In such cases, the inclusion of such an explicit probing flag permits that a base station may take a future expected behavior into account in order to more precisely determine the QoS parameter.

Optionally, the determining, at the base station, of the QoS parameter related to the probing session comprises building, by the base station, a resource reservation plan for the probing session. Building such a resource reservation plan can contribute in more precisely determining the QoS parameter by the base station without having to open a session exclusively for this purpose.

Optionally, the determining, at the base station, of the QoS parameter related to the probing session comprises preventing establishing active sessions at the base station and comprises preventing releasing current active sessions at the base station. Such a system freeze at the base station during determination of the QoS ensures that the system remains stable during such determination.

Optionally, the QoS parameter request further relates to one or more additional sessions, the descriptor further relating to the one or more additional sessions and the indication further indicating that the one or more additional sessions are one or more additional probing sessions. This permits QoS determination for a given multi session topology. More specifically, the determining, at the base station, of the QoS parameter related to the probing session comprises determining, at the base station, the QoS parameter related to the one or more additional probing sessions; and building, by the base station, a resource reservation plan for the probing session and for the one or more additional probing sessions. Such plan building enables Qos determination without having to open multiple sessions for this purpose.

The present disclosure also describes a method to determine a Quality of Service, Qos, parameter, the method comprising:
  transmitting, by a transmitting entity, and to a plurality of base stations, QoS parameter requests for a session, whereby each request comprises a descriptor for the session and an indication that the session is a probing session;
  receiving, at the transmitting entity, and from each base station of the plurality, base station specific QoS parameters related to the probing session;
  compiling, by the transmitting entity, the received base station specific QoS parameters into a QoS profile; and
  transmitting, by the transmitting entity, and to a control entity, the QoS profile.

Such a method enables a proactive determination of QOS parameters by interrogating a plurality of base stations in a centralized manner instead of proceeding with an iterative trial and error reactive process to determine such QoS parameters.

The present disclosure also describes a computer-readable storage medium comprising instructions, which, when executed by a processor of a computing device, cause the processor to carry out any of the methods hereby described.

The present disclosure also describes a device comprising a processor, a memory and a networking module, the processor being configured to operate according to any of the methods hereby described.

DESCRIPTION OF EMBODIMENTS

This disclosure applies to method to determine a Quality of Service, QOS, parameter. A QoS parameter should be understood as one or more measure of communication quality in a network. Examples of a QoS parameter may relate to throughput, transit delay, priority, protection, error rate or resilience. Throughput may be defined as a number of bits successfully transferred between entities during a defined amount of time. Transit delay may be defined as an elapsed time for successful transfer of data between two entities. Priority may be defined as a relative importance of a connection between two entities, whereby lower priority may lead to connection quality of service degradation or even to a release of resources. Protection may be defined as an extent to which an entity attempts to prevent unauthorized monitoring or manipulation of transmitted data. Error rate may be defined as a ratio of total incorrect, lost and duplicated data to a total data transferred between two entities during a period of time. Resilience may be defined as a probability of an entity disconnecting or resetting a connection during a given time interval.

Figure 1:
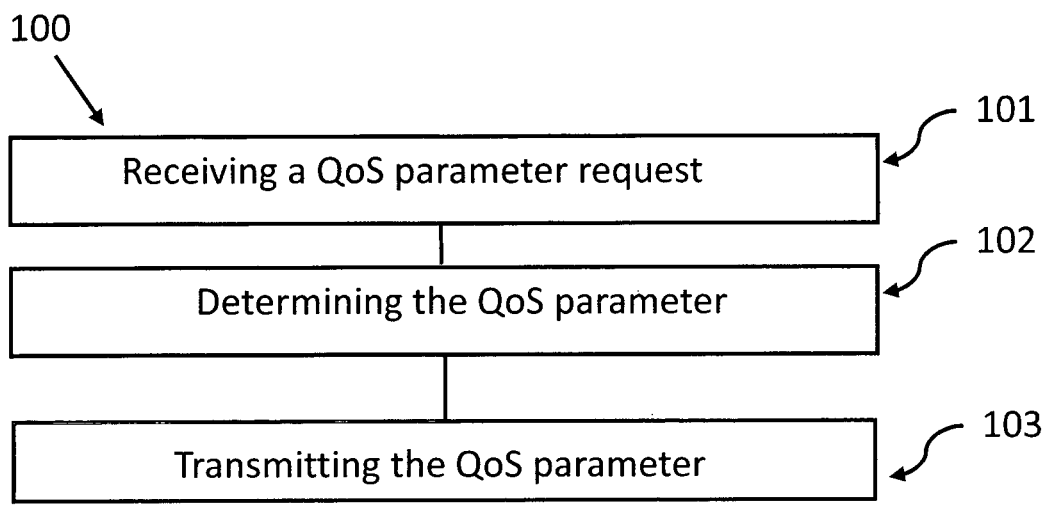
FIG. 1 illustrates an example method.

FIG. 1 discloses an example method 100 to determine a Quality of Service, QoS, parameter according to this disclosure. Method 100 comprises block 101 illustrating the receiving, at a base station, and from a transmitting entity, a QoS parameter request for a session, whereby the request comprises a descriptor for the session and an indication that the session is a probing session.

A base station should be understood in this disclosure as a transceiver in a wireless communication network. A base station may communicate with other base stations, with different network entities, and with mobile devices located within wireless communication reach of the base station. Mobile devices located within wireless communication reach of a base station may be considered as located within a cell of the base station concerned, the cell being comprised in a cellular network. In some examples, the base station is a 5G base station. In some cases, the base station is a stationary transceiver in a wireless communication network.

As illustrated in block 101, the base station receives a QoS parameter request for a session. A session should be understood as an association between a mobile device and a data network that provides a data exchange service. An example session is in accordance with 3GPP 23.501. A session may be related to a specific communication protocol such as a packet data unit (PDU) session for example. A session may in some cases offer several data exchange services with different QoS characteristics. The QoS parameter request is for the session in that the Qos parameter applies to the QoS of the communications which would take place using such a session or data communication exchange association. In some cases, a plurality of communication services may be comprised in a single session. The QoS parameter may apply to the session or to each, a subset of or all of the communication services which may be comprised in the session.

As illustrated in block 101, the base station receives a QoS parameter request for a session from a transmitting entity. A transmitting entity should be understood as a network entity being either a hardware or virtual network entity. The transmitting entity may transmit wirelessly or by wire. A transmitting entity may be part of a chain of transmitting entities, whereby the QoS parameter may be transmitted from a first transmitting entity to a second transmitting entity, from the second transmitting entity to a third transmitting entity, and from the third transmitting entity to the base station. In such a case, the third transmitting entity directly transmits the QoS request to the base station, while the second or first transmitting entities indirectly transmit the QoS request to the base station. In some cases, the transmitting entity generates the QoS request. Examples of transmitting entities include a TSN-AF (application function), a SMF (session management function) or an AMF (access and mobility function).

As illustrated in block 101, the request comprises a descriptor for the session. Such a descriptor should be understood as a descriptor of a session profile comprising for example one or more of a protocol version number, an originator and session identifier, a session name, bandwidth information, encryption information or active session time. Such a descriptor provides information allowing the base station to determine the type and nature of session related to the descriptor.

As illustrated in block 101, the request comprises an indication that the session is a probing session. This indication should be understood as indicating to the base station that the session related to the descriptor is for probing purposes. The base station may then be in a position to take into account that the probing session differs from sessions which should effectively be established in order to effectively transmit or receive data.

Method 100 further comprises block 102 which illustrates determining, at the base station, the QOS parameter related to the probing session. The determining of the QoS parameter is taking place at the base station to enable a proactive determination of the QoS. Having the base station determining itself the QoS permits determining such QoS particularly precisely and rapidly, due to the fact that the base station has direct visibility to network limitations at its level.

Method 100 further comprises block 103 which illustrates transmitting, by the base station, the determined QoS parameter to a receiving entity. Such transmission permits informing the receiving entity of the determined QoS parameter, whereby such receiving entity may for example take this information into account to integrate a wireless communication system comprising the base station concerned into a broader communication system.

In some examples, the transmitting entity and the receiving entity is a same entity. In some example, the QoS parameter request follows a given path through a plurality of transmitting entities, the determined QoS parameter following a return path corresponding to the same path as the path followed by the request. In an example, the request passes, in this order, from a first to a second and third transmitting entity, the related determined QoS parameter being received, in this order, at the third, second and first entity. In an example, the entity is a TSN-AF entity. In an example, the entity is a SMF entity. In an example, the entity is an AMF entity. In an example, the QoS parameter request is transmitted from a TSN-AF to an SMF, from the SMF to an AMF, and from the AMF to the base station, the determined QoS parameter being received from the base station at the AMF, received from the AMF by the SMF, and received by the TSN-AF from the SMF. The TSM-AF may act as a translator with a control plane of a TSN system, the TSN system being for example a centralized architecture comprising a CNC (centralized network configuration) node. Such a process permits for example integrating a 5G system comprising the base station as a TSN bridge into a TSN system. Such examples may in some cases be implemented in a method as illustrated in FIG. 1.

In some examples, the request comprises several messages. A message should be understood as a unit of communication between two network entities. While in some examples the request may be transmitted into a single message, the request may also be transmitted using several messages. In some examples, a first message comprises the indication that a session is a probing session, and a second message comprises the descriptor for the session. Other combinations may be considered, which may depend on a protocol dependent message size. Such examples may in some cases be implemented in a method as illustrated in FIG. 1.

In some examples, the base station does not reserve resources as an action relative to the request. In some examples, the base station prevents reserving resources in response to the session being identified as a probing session. In some examples, due to the session being identified as a probing session, no currently active session at the base session is impacted resource wise. In some examples, none of the resources controlled by the base station are assigned to the probing session. Such resources may for example comprise one or more of radio resources, memory resources or computing or processing resource. This permits avoiding impacting performance or QoS of currently active sessions. Such examples may in some cases be implemented in a method as illustrated in FIG. 1.

In some examples, the QoS parameter request comprises a QoS parameter determination context, whereby the QoS parameter determination context comprises both a parameter determination constraint and an indication of a type of QoS parameter to be determined within the parameter determination constraint. A QoS determination constraint should be understood as information permitting to determine under which conditions the QoS parameter should be determined. More specifically, the QoS parameter determination constraint may comprise one or more of a maximum bit rate (or maximum throughput), a priority, or a packet error rate. Other examples of information which may be comprised in the QoS parameter determination constraint are protection or resilience information or data packet size. A base station may indeed be in a position to consider a probing session in different context or under different constraints, each context or constraints leading to a different QoS parameter. The parameter determination constraints may be communicated using precise values, using thresholds or using ranges. In some examples, the type of QoS parameter to be determined within the parameter determination constraints comprises delay information. For example, if a constraint comprises a particular maximum bit rate, or particular throughput, the type of QoS parameter to be determined may comprise a minimum and a maximum delay that the base station could guaranty considering the given constraints. For example, if a constraint comprises a maximum bit rate and a delay information, the type of QoS parameter to be determined may comprise a maximum error rate that the base station could guaranty considering the given constraints. In other words, QoS may correspond to a number of variables, the constraints leading to setting or reducing the variability of some of the variables in order to determine a value of another variable which corresponds to the QoS parameter to be determined. Such examples may in some cases be implemented in a method as illustrated in FIG. 1. In some cases, a plurality of communication services may be comprised in a single session. The QoS parameter determination context may apply to the session or to each, a subset of or all of the communication services which may be comprised in the session.

In some examples, the request comprises a probing flag, the probing flag indicating considering the probing session as replacing current active sessions at the base station, or the probing flag indicating considering the probing session in addition to current active sessions at the base station. The probing flag should be understood as an additional information which the base station may take into account in order to more precisely determine the QoS parameter. If, for example, the probing flag indicates considering the probing session as replacing current active sessions, it is likely that the base station will consider assigning more or more performant resources to the probing session than in a case where the probing flag indicates that the probing session would be in addition to current active sessions, in which case resources to be considered as available for the probing session would indeed be more limited. In some examples, the probing flag, regardless of the indication it provides, has no impact on current active sessions precisely because it refers to a probing session and not to a session which is effectively established. Such examples may in some cases be implemented in a method as illustrated in FIG. 1.

In some examples, the QoS parameter request further relates to one or more additional sessions, the descriptor further relating to the one or more additional sessions and the indication further indicating that the one or more additional sessions are one or more additional probing sessions. In such cases, the QoS parameter permits describing a topology including multiple sessions in order to determine the QoS parameter at the base station, each one of the various sessions being a probing session as per this disclosure. More specifically, an example method would in such cases for example comprise determining, at the base station, the QoS parameter related to the one or more additional probing sessions and building, by the base station, a resource reservation plan for the probing session and for the one or more additional probing sessions. In some cases, each probing session is associated to a specific determined QoS parameter. In some cases, a specific determined QoS parameter relates to several probing sessions. In some cases, a specific determined QoS parameter relates to all probing sessions. Such examples may in some cases be implemented in a method as illustrated in FIG. 1.

It should be understood that a resource reservation plan is for planning purposes according to this disclosure and does not imply reserving such resources when in a planning phase of building a resource reservation plan.

Figure 2:
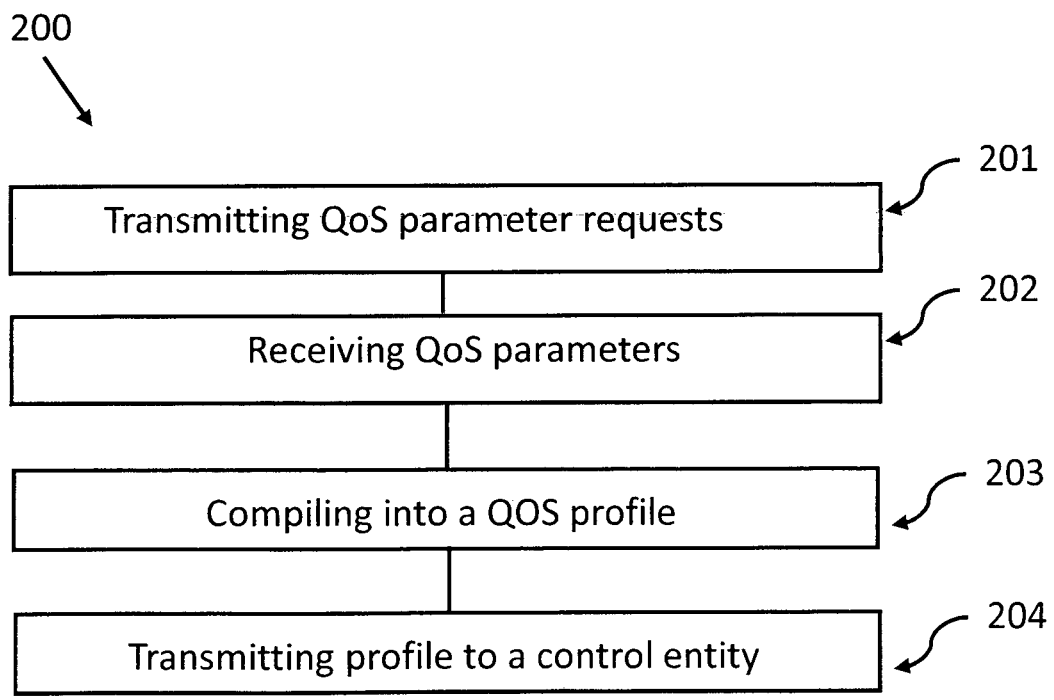
FIG. 2 illustrates another example method.

FIG. 2 illustrates an example method 200 to determine a Quality of Service, QoS, parameter according to this disclosure, whereby the method 200 comprises as illustrated in block 201 transmitting, by a transmitting entity, and to a plurality of base stations, QoS parameter requests for a session, whereby each request comprises a descriptor for the session and an indication that the session is a probing session. Method 200 is seen from the point of view of the transmitting entity and may in some cases be executed together with a method such as example method 100 seen from a base station point of view. Method 200 applies to a plurality of base stations, whereby each of the base stations of the plurality may operate an example method 100.

As illustrated in block 202, method 200 comprises receiving, at the transmitting entity, and from each base station of the plurality, base station specific QoS parameters related to the probing session. This permits collecting at the transmitting entity the various QoS parameters from the various base stations. In some examples, the transmitting entity may be a TSN-AF, each base station being integrated by the methods according to this disclosure as a TSN bridge into a TSN system.

As illustrated in block 203, method 200 comprises compiling, by the transmitting entity, the received base station specific QoS parameters into a QoS profile. Such a profile combines the QoS parameters from the various base stations of the plurality. The profile may for example be in a table form. The profile may for example be in a list form.

As illustrated in block 204, method 200 further comprises transmitting, by the transmitting entity, and to a control entity, the QoS profile. A control entity may be for example a control entity of a centralized network architecture. A control entity may be connected to different transmitting entities, each transmitting entity operating according to a method such as method 200. In some examples, the control entity is a CNC note of a TSN network.

Figure 3:
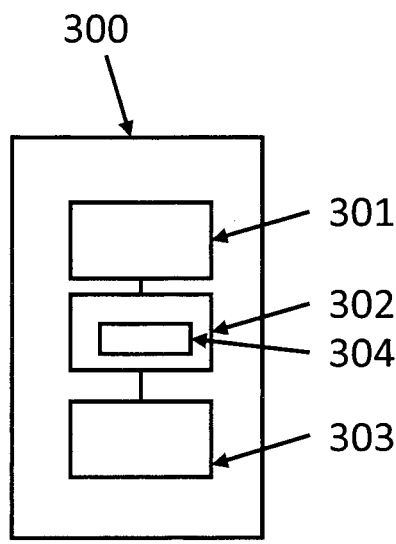
FIG. 3 illustrates an example device.

FIG. 3 illustrates an example device 300 comprising a processor 301, a memory 302 and a networking module 303, the processor 301 being configured to operate according to any of the methods hereby described. In some examples, the device 300 is a base station. In some examples, the device 300 is a transmitting entity. In some examples, the device 300 is a control entity. Processor 301 may comprise electronic circuits for computation managed by an operating system FIG. 3 also illustrates a non-transitory machine-readable or computer readable storage medium, such as, for example, memory or storage unit 302, whereby the non-transitory machine-readable storage medium is encoded with instructions 304 executable by a processor such as processor 301, the machine-readable storage medium comprising instructions 304 to operate processor 301 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

In some further examples described below, methods, devices or computer readable storage according to this disclosure are used for integration of 5G communication systems (5GS) into the framework of time sensitive networks (TSN), for example in the field of wireless industrial communication systems.

A TSN network may comprise a TDMA (time-division multiple access) wired Ethernet based network relying on IEEE 802.1 TSN standard. The TSN communication system may rely on a high precision synchronization protocol shared between nodes of a network as defined in the IEEE 802.1AS. A component of a TSN system is a time aware packet traffic shaper (TAS) used for the timely transmission of TSN packets and for jitter reduction. As an Ethernet network, a TSN network may be formed of end nodes (talker/listener nodes) and bridge nodes connecting between end nodes through bi-directional Ethernet links. Three example architecture alternatives are possible for the TSN network: a centralized architecture; a fully distributed architecture; and a network centralized and user distributed model.

Figure 4:
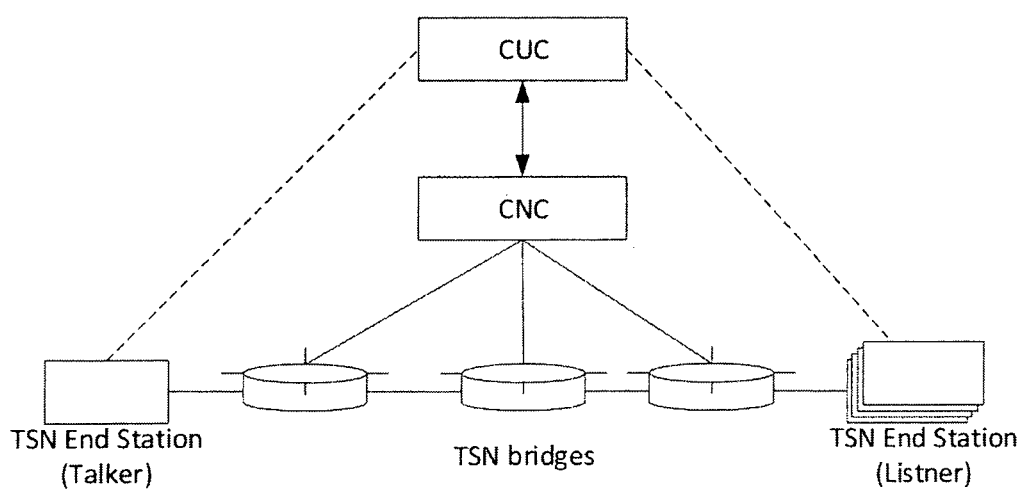
FIG. 4 illustrates an example of device architecture for applying an example method.

In the TSN centralized architecture, as illustrated in FIG. 4, end stations are transmitting flow requirements and a TSN communication configuration to a centralized user configuration system (CUC). The CUC transmits the user configuration to a centralized network configuration node (CNC). Each TSN switch identifies to the CNC as a delay managed object. Example parameters transmitted to the TSN by the switch are egress and ingress port identification, traffic class and QoS parameters such as minimum and maximum delays per port pairs, for example. The CNC may calculate a schedule, the schedule comprising for example transmission time, for the switches between TSN end stations, and control parameters of the TAS of the different switches as well as routing decisions, i.e. switch selection. Such calculations may be performed to fulfil stream requirements of the TSN communications.

Figure 5:
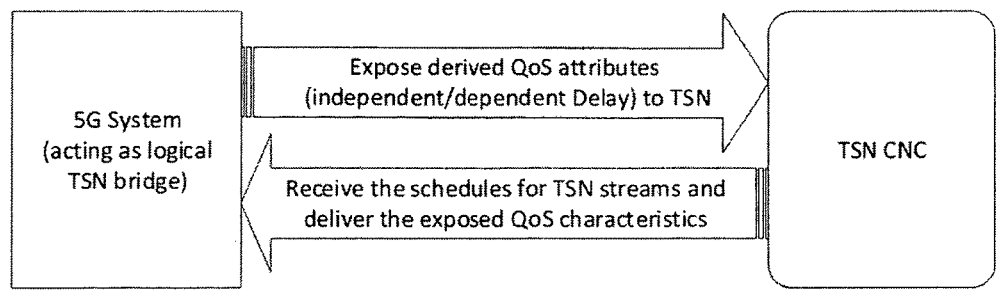
FIG. 5 illustrates an example of device architecture for applying an example method.

In an example, a 5G system is considered as a TSN bridge which receives timing and control information from the CNC through the TSN-AF as illustrated in FIG. 5. The TSN-AF translates the control information and transmits it to a policy control function (PCF) which defines a profile for the packet data unit (PDU) session that will be implemented by the session management function (SMF) and access mobility management function (AMF). This profile may aim to propagate TSN packets in the network, viewed as a logical TSN bridge to the TSN end stations, according to the CNC timing schedule. The 5GS architecture is in this example illustrated in FIG. 6.

Figure 6:
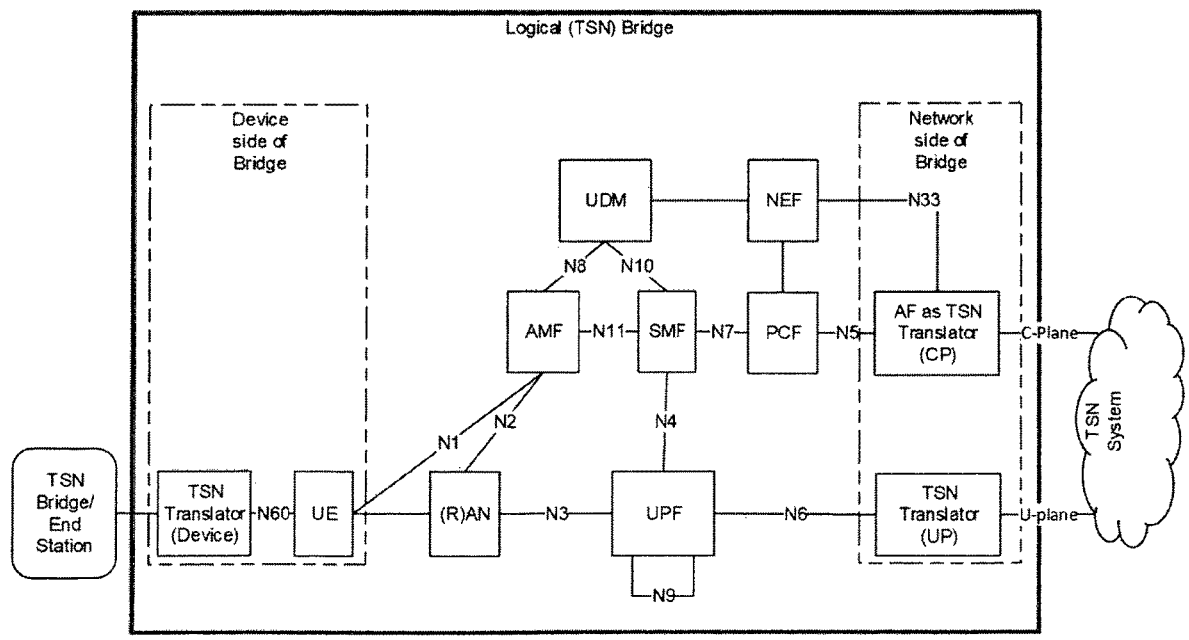
FIG. 6 illustrates an example of device architecture for applying an example method.

Referring to FIG. 6, the user plane of the TSN translator engines are translating the protocols from TSN into GTP-U packets (an example General Packet Radio Service GPRS Tunneling protocol) over an N60 interface (for uplink TSN transmission) or into packets to be transmitted over the 5G system, for example over an N3 and a Uu interface for downlink TSN transmission. The control plane of the TSN translator engine, (AF), is mapping the TSN control information coming from the CNC into a QoS profile information which is transmitted to a policy control function (PCF). If the PCF agrees and the 5GS is able to fulfil the requested QoS from TSN systems, 5G QoS indication (5Q1) is used to setup a PDU session. In this example two hold and forward buffers are used for de-jittering of the TSN transmission, one at the user plane TSN translator (NW-TT) for uplink transmission or at the device TSN translator (DS-TT) for downlink transmission in order to minimize or reduce jitter and re-synchronize packets exiting from the UPF (user plane function) and the UE (user equipment). At the radio access network (RAN) level various techniques may be used to reduce the latency and increase the reliability of the transmission of the TSN PDU session. Time sensitive communications assistance information (TSCAI) comprising the following information may be used for the quality of service control of a TSN flow in a network:

Flow Direction: the direction of a TSC (time sensitive communication) flow (uplink or downlink)

Periodicity: refers to the time period between the start of two successive bursts Burst Arrival time: The arrival time of a data burst at either the ingress of a RAN (radio access network, or base station) (downlink flow direction) or egress interface of a UE (uplink flow direction).

This information is in this example provided by the session management function (SMF) based on the information received from the PCF as a QoS flow profile implemented by the RAN (or base station). The RAN may implement specific scheduling schemes, e.g. configured grant scheduling with transmission of K-repetitions of the packets. Additional mechanisms may be used to limit the delay at the MAC (Media access control)/RLC (Radio link control)/PDCP (Packet data convergence protocol) layers such as to take into account the TSCAI for dimensioning RLC and PDCP buffers at the base station and the TSN capable UE. In order to configure the schedules of the TSN network, the CNC receive parameters from the 5G system as per the methods described hereby which contribute to the CNC identifying a schedule for a transmission from TSN talkers to TSN listeners passing through the 5GS. To this end, the 5GS may expose to the CNC two delay characteristics such as the minimum end to end delay and the maximum end to end delay of the transmission of various TSN flows and per TSN capable use terminal. Such delay characteristics may be comprised in a QoS parameter according to example methods. The methods hereby described enable relying on learning capabilities of, for example, NG-RAN node base stations. Such methods contribute to adding scalability and reducing the latency of an overall initial configuration of a 5GS as a bridge of TSN network by avoiding an alternative method based on iterated trial and error learning of a network configuration and performance capacity through a TSN application function, which may be less scalable and more time consuming.

Figure 7:
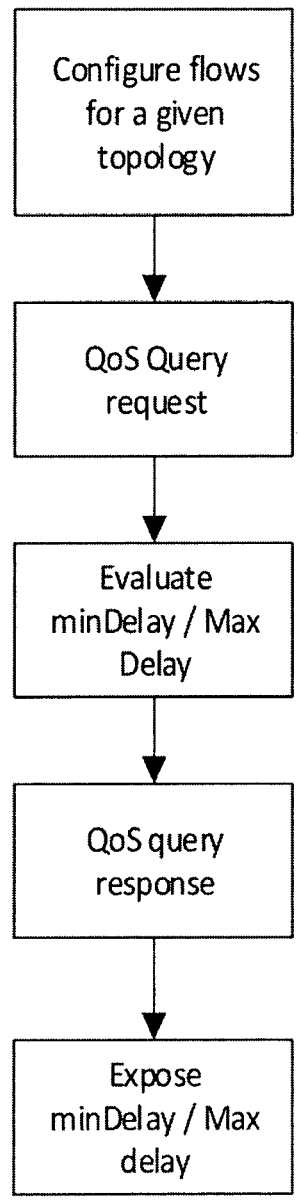
FIG. 7 illustrates a further example method.

During an example initial configuration of a 5G system as a TSN bridge according to an example method, it is proposed to add in 5GS signaling a new QoS_query message, corresponding in this example to the QoS parameter request according to this disclosure, between 5G core network and NG-RAN. This QoS_query message triggers the QoS parameter determination process by the NG-RAN base station. The NG-RAN base station for example estimates its capacity, i.e. performance parameters (such as, for example, delay, throughput . . . ) which the base station is in a position to provide for a topology provided, taking into account for example number of UEs, scheduling algorithms, radio interferences and radio channel statistics, and provided in the form of a descriptor for one or more sessions. In this example, the interface between the 5GS bridge and the TSN system is not impacted. This example is illustrated in FIG. 7, the given topology, in this case configured in the form of flows, or communication services of a session, being communicated in the session descriptor as part of the QoS parameter request (or QOS Query Request), the parameters, in this case minimum and maximum delays, being determined or evaluated by the base station and transmitted back as a QoS query response corresponding to the determined QoS parameter, to then expose or transmit such determined QoS parameters to the CNC.

Figure 8:
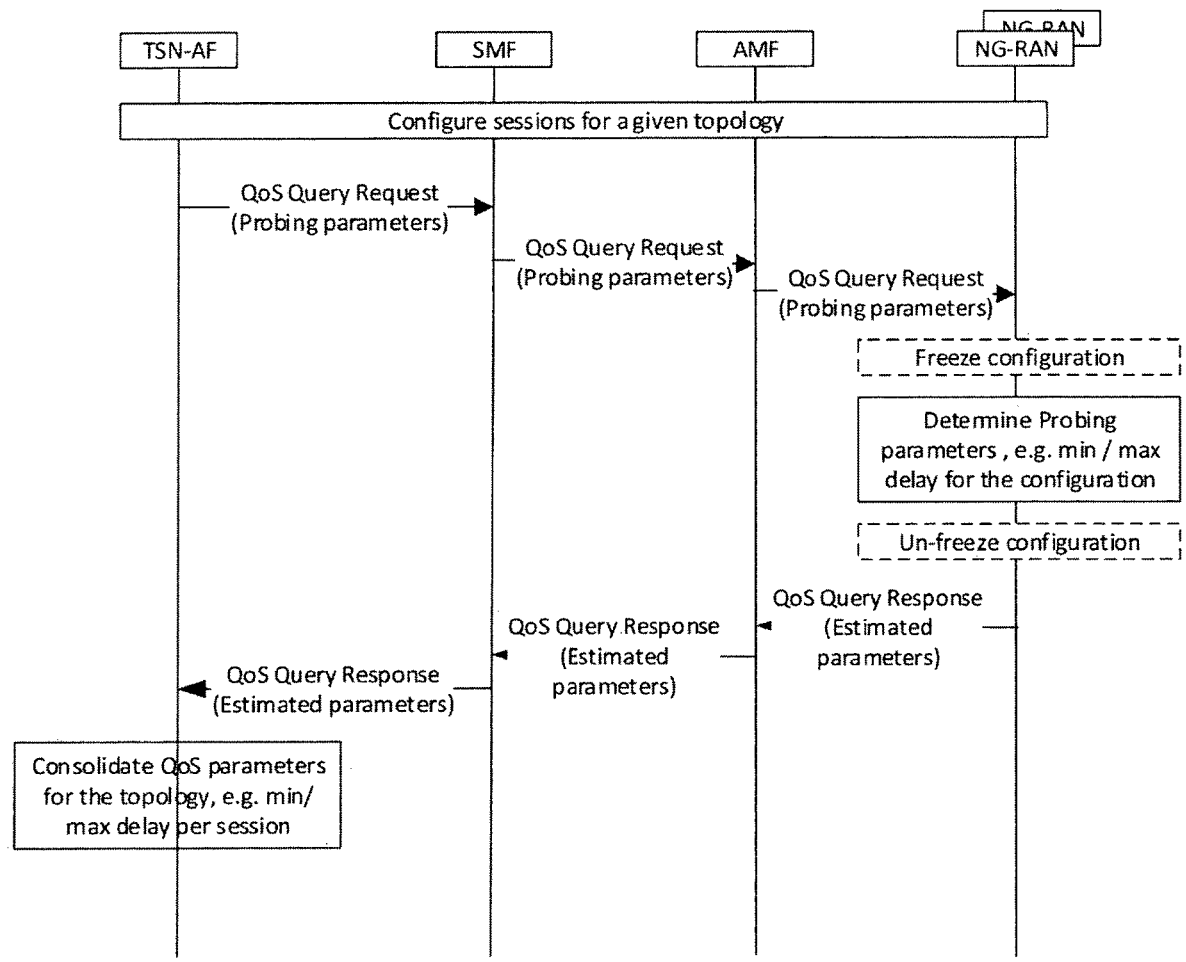
FIG. 8 illustrates yet another example method.

In this example, the method according to this disclosure may be considered a bottom-up approach, i.e. informing the CNC from the 5GS base stations. The relevant network parameters for the integration of the 5G system with TSN are indeed determined pro-actively in the radio access network and are transmitted to the application function by the means of the QoS query (or QoS parameter request) procedure. UEs being part of the 5GS bridge may first be registered in the 5GS network. The TSN-AF may select UPFs and set up PDU sessions for the set of UEs. This defines a given topology for the 5GS bridge, i.e. it defines a set of port numbers, port addresses and packet forwarding rules from the UEs to the selected user plane function that corresponds to the PDU sessions. The QoS Query Request triggers the procedure of determination by NG-RAN nodes of the performance parameters as illustrated in FIG. 8. The QoS Query Response message is used to transmit the performance parameters or determined QoS parameters to the TSN application function and/or to expose to the CNC through network exposure function (NEF) the relevant network parameters for the scheduling calculations of the CNC. In this case, 5GS bridge capacity (in terms of QoS performance parameters) for a given topology may be determined rapidly and avoiding trying loops. A scheduler in the NG-RAN node is in this example the entity which determine QoS support over the radio link. The NG-RAN base station is indeed well placed to be aware of constraints and capabilities of a radio link. The procedure may apply to a given topology (or sessions configuration) as a whole. The capacity determination (or QoS parameter determination) may take into account inter-UEs interferences, statistics or predictions on radio channel conditions by the base station. The capacity determination (or QoS parameter determination) may be efficiently used by the session management function to determine packet routing and forwarding rules at the UPF proactively in order to adjust to the NG-RAN capabilities and consolidate bridge capabilities.

As illustrated in FIG. 8, in a first step an initial configuration of the sessions is performed. The step is performed in this case between the TSN application function (TSN-AF), the access and mobility function (AMF), the session management function (SMF) and the radio access network (NG-RAN). The configuration comprises for example the determination of PDU sessions between one or several TSN capable UEs and one or several UPFs.

The QoS parameter request refers in this case to a special session called 'probing' session. This may be done by including in the request a special QoS flow indicator (or indication that the session is a probing session), meaning that the PDU session is intended to QoS probing. The base station therefore does not have to reserve resources for communication flows.

The QoS parameter request may in this example indicate for the PDU probing sessions requirements (or QoS parameter determination constraints) such as throughput, delay or priority. In addition to this, the QoS parameter request comprises the probing indication (or indication that the session or sessions are probing sessions), which may be common to one PDU session, or per QoS parameter (probe on delay for example). In some examples, a probing session is related to a given target throughput and a given packet size as QoS parameter determination constraints, and as a probe on delay as QoS parameter to determine by the base station in function of the constraints. The base station may then estimate or determine the delay (determined QoS parameter in this case) the base station could support for that flow, and/or provide an interval or range of delay which the base station estimates being able to support around a value determined as QoS parameter for the probing session.

A QoS parameter request may in an example comprise:
Guaranteed Flow Bit Rate (GBR)=n bit/s (given as parameter determination constraint)
Delay=y ms (given as a target in millisecond)
Probing on delay (as a QoS parameter to determine)

In this example, the session parameters request to estimate for example a min and max delay that could be achieved assuming a GBR flow of n bit/s. Note that in this example, a target delay is provided, indicating what is expected. The base station may ignore the target delay for its estimation, or this target indication could be absent. The base station may also take the target information such as target delay into account to select appropriate resources (without actually using such selected resources for this purpose due to the fact that this is a probing session and not an effective session).

The probing indication or indicator that the session is a probing session may in this example be used by the base station to modify base station session access control. For example, in the case of probing, the base station may accept all requested probing sessions due to the fact that such sessions are for probing purposes and will not impact effective current sessions at the base station. Indeed, in a non-probing case, a base station accepts a session including a given Qos requirement only if the base station estimates that it has sufficient resource and capacity to handle it. In the probing context however, the base station may accept a given probing session configuration regardless of current resource usage to provide back an estimation of the QoS that it could support for that session. The base station may indeed in the case of probing as per examples of this disclosure consider different scheduling parameters and/or static HARQ or other physical layer parameters in order to determine for various physical layer configurations the relevant performance parameters (or QoS parameters).

As illustrated in FIG. 8, the TSN-AF sends a QoS Query Request message (corresponding to the QoS parameter request) in order to trigger QoS probing (corresponding to determining the QoS parameter) at the NG-RAN base station based on the session parameters configured in the previous step. The message may include:

A list of sessions identifiers that compose the topology to probe; and

An indication of the parameters that have to be estimated or determined, for example a min and max delay. The message is non UE-specific, in the sense that the probing is not to be made on a specific session, but on a topology, i.e. on a set of sessions and corresponding NG-RAN parameters.

This allows to determinate a capacity (or QoS parameter) for the given topology corresponding to the probing session (s), taking into account resource sharing strategy between the different sessions. The QoS Query Request also includes in this case a flag parameter, or ProbingFlag, indicating how the probing request is interacting with current active (non-probing) sessions. If the flag is set to "Addition", the base station determines the QoS parameters it could support for the sessions identified in the session identifier list in addition to the current on-going sessions. If the flag is set to "Replace", the base station determines the QoS parameters for the sessions identified in the session identifier list without considering current on-going sessions, i.e. as if all resources are available. In both cases, the on-going sessions are not actually impacted, meaning that a QoS Query Request can be done on-line, i.e. without having to stop traffic. "Replace" may be used as probing flag to evaluate what would be the overall impact of adding a new flow or sessions. It could be used also to test what would become the switch capacity in case of an on-going flow or session is removed.

As illustrated in FIG. 8, when receiving the QoS Query Request message, the base station determines the required QoS parameters as defined in the session description and/or in the QoS request message. For example, the base station estimates for each session the minimum and the maximum delay the base station will be able to support. The base station may for example do its estimation by building a resource reservation plan for the different sessions, knowing physical layer configuration, available radio resources and an estimation of radio channel conditions. The base station may estimate possible resource configuration based on a deployment topology received at an initial flow configuration step and determines QoS parameters as average values. The base station may estimate possible resource configuration based on a deployment topology received at the initial flow configuration step and determines the QoS parameter as a worst case value. In some cases, the base station estimates the QoS parameters based on a given session configuration, whereby such configuration remains stable during the probing, i.e. no session should be established or released during the time period by including corresponding freeze/unfreeze actions. In such cases, after a configuration freeze, the base station rejects session establishment, modification or release, until a configuration unfreeze.

As illustrated in FIG. 8, the QoS parameter estimations or determined QoS parameter is transmitted in a QoS Query Response message to the TSN-AF for each probing session. These parameters are indicated in the QoS Query Request message.

As illustrated in FIG. 8, the TSN-AF receives in the QoS Query Response message the estimated network capabilities as QoS parameter values of the QoS parameters and consolidates such QoS parameter values in a QoS profile, for example by mapping these values with the topology transmitted during the initial flow configuration. These parameters possibly coming from several base stations (several NG-RAN as per FIG. 8). Each such base station may be exposed as part of a 5GS bridge per-port parameter to the CNC of the TSN system.

Example methods as per this disclosure may take place between a CN (core network) and a RAN (base station). Example methods as per this disclosure may also be used between functions of the CN to trigger and estimate QoS parameters along the data plane path between the RAN and the CN and inside the CN.

In some examples, the probing parameters or the content of the QoS parameter request in the QoS query message could be different or could be changed between the TSN-AF and the SMF, between the SMF and the AMF and between the AMF and the NG-RAN. The SMF may for example intercept a QoS query response, extract the relevant QoS parameters and use these QoS parameters for the selection and the update of user plane function (UPF) topology. Such modification of the QoS parameter request by an intermediate entity such as the SMF may be through additional containers in messages from the SMF to the UPF. Such selection may be for example based on:

The selection of UPF able to introduce minimum delay and jitter for expected TSN transmission. An update of packet forwarding rules (FAR) based on the received QoS information from the QoS query response message where the SMF is maintaining the UPF capacities and transmits and updating version of the FAR to the UPFs.

An update of a QoS enforcement rule (QER) which is provided by the SMF to the UPF where the SMF is maintaining the UPF capacities and transmits and updating version of the QER to the UPFs.

Specific sessions may be configured for the probing of the QoS parameters in the core network, i.e. at the interface between NG-RAN and UPF. These specific sessions or PDU sessions may be used to further probe the N4 interface based on the QoS_Query_response message.

In some examples, when the QoS parameter is determined, the probing sessions are removed.

Figure 9:
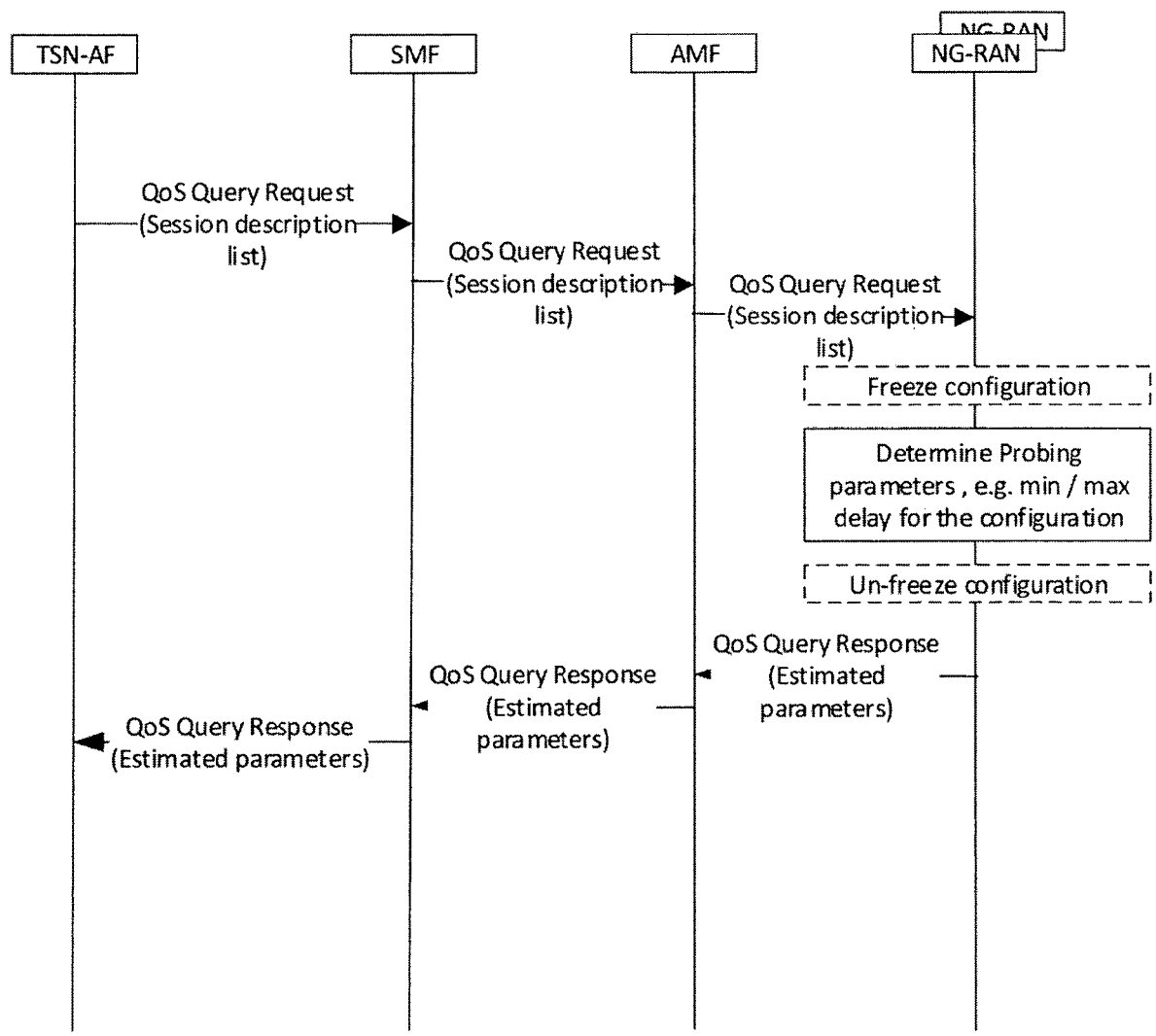
FIG. 9 illustrates yet a further example method.

A further example of a method according to this disclosure is illustrated in FIG. 9, whereby a list of probing session description is included directly in the query request message as session descriptor, instead of for example using sessions identifiers in session descriptors as per the example of FIG. 8. In this example according to FIG. 9, the PDU sessions may refer to a specific UE, each session description of the list including in addition to QoS parameters an identifier of the specific UE. Between AMF and NG-RAN, this can be done for example through a specific identifier referring to the UE context in the base station, and a session identifier between functions of the core network (SMF, AMF).

The invention claimed is:

1. A method to determine a Quality of Service, QoS, parameter, the method comprising:
   receiving, at a base station, and from a time sensitive networks application function (TSN-AF) entity, a QoS parameter request to establish a current session, whereby the QoS parameter request comprises a descriptor for the current session and an indication that the current session is a probing session between the base station and a mobile device for purpose of probing the QoS parameter to be applied in a protocol data unit (PDU) session to be established in the future between the base station and the mobile device for purpose of transmitting and/or receiving data from/to a data network in accordance with the determined QoS parameter;
   determining, at the base station, the QoS parameter related to the current probing session; and
   transmitting, by the base station, the determined QoS parameter to the TSN-AF entity,
   wherein the base station is prevented from reserving resources for use by the mobile device during the current probing session, and
   wherein the base station will reserve resources for use by the mobile station during the future PDU session for the transmitting and/receiving of data from/to the data network.

2. The method according to claim 1, whereby the QoS parameter request comprises several messages.

3. The method according to claim 1, whereby the base station does not reserve resources as an action relative to the QoS parameter request.

4. The method according to claim 1, whereby the QoS parameter request comprises a QoS parameter determination context, whereby the QoS parameter determination context comprises both a parameter determination constraint and an indication of a type of QoS parameter to be determined within the parameter determination constraint.

5. The method according to claim 4, whereby the QoS parameter determination constraint comprises one or more of a maximum bit rate, priority, or packet error rate, and whereby the type of QoS parameter to be determined within the parameter determination constraint comprises delay information.

6. The method according to claim 1, whereby the QoS parameter request comprises a probing flag, the probing flag indicating considering the current probing session as replacing current active PDU sessions at the base station, or the probing flag indicating considering the current probing session in addition to other current active PDU sessions at the base station.

7. The method according to claim 1, whereby the determining, at the base station, of the QoS parameter related to the current probing session comprises building, by the base station, a resource reservation plan for the current probing session.

8. The method according to claim 1, wherein, while the base station is determining the QoS parameter related to the current probing session, the base station is prevented from releasing any current active PDU sessions and from establishing an additional PDU session at the base station.

9. The method according to claim 1, whereby the QoS parameter request is also to establish one or more additional current probing sessions between the base station and one or more other mobile stations, the descriptor further relating to the one or more additional current probing sessions and the indication further indicating that the one or more additional current probing sessions are being requested.

10. The method according to claim 9, whereby the determining, at the base station, of the QoS parameter related to the current probing session comprises:
    determining, at the base station, the QoS parameter related to the one or more additional current probing sessions; and
    building, by the base station, a resource reservation plan for the current probing session and for the one or more additional current probing sessions.

11. A method to determine a Quality of Service, QoS, parameter, the method comprising:
    transmitting, by a time sensitive networks application function (TSN-AF) entity, and to a plurality of base stations, QoS parameter requests to establish a current session, whereby each QoS parameter request comprises a descriptor for the current session and an indication that the current session is a probing session between the base station and a mobile device for purpose of probing the QoS parameter to be applied in a protocol data unit (PDU) session to be established in the future between the base station and the mobile device for purpose of transmitting and/or receiving data from/to a data network in accordance with the determined QoS parameter;
    receiving, at the TSN-AF entity, and from each base station of the plurality of base stations, base station specific QoS parameters related to the current probing session; and
    compiling, by the TSN-AF entity, the received base station specific QoS parameters into a QoS profile,
    wherein the base station is prevented from reserving resources for use by the mobile device during the current probing session, and
    wherein the base station will reserve resources for use by the mobile station during the future PDU session for the transmitting and/receiving of data from/to the data network.

12. A non-transitory computer-readable storage medium comprising instructions which, when executed by a processor of a computing device, cause the processor to carry out the method of claim 1.

13. A device comprising a processor, a memory and a networking module, the processor being configured to operate according to claim 1.

\* \* \* \* \*